United States Patent
Sakurai et al.

(10) Patent No.: US 10,706,992 B2
(45) Date of Patent: Jul. 7, 2020

(54) INSULATED FLAT CONDUCTIVE WIRE HAVING HIGH ASPECT RATIO, METHOD FOR MANUFACTURING SAME, AND COIL

(71) Applicant: MITSUBISHI MATERIALS CORPORATION, Tokyo (JP)

(72) Inventors: Hideaki Sakurai, Amagasaki (JP); Koji Hirano, Amagasaki (JP)

(73) Assignee: MITSUBISHI MATERIALS CORPORATION, Tokyo (JP)

( * ) Notice: Subject to any disclaimer, the term of this patent is extended or adjusted under 35 U.S.C. 154(b) by 0 days.

(21) Appl. No.: 15/937,036

(22) Filed: Mar. 27, 2018

(65) Prior Publication Data

US 2019/0066883 A1 Feb. 28, 2019

(30) Foreign Application Priority Data

Aug. 22, 2017 (JP) .................. 2017-159701

(51) Int. Cl.
*H01B 7/08* (2006.01)
*H01B 13/16* (2006.01)
(Continued)

(52) U.S. Cl.
CPC ........... *H01B 13/16* (2013.01); *C09D 5/4461* (2013.01); *C25D 13/06* (2013.01); *H01B 3/305* (2013.01);
(Continued)

(58) Field of Classification Search
CPC ........................................ H01B 7/08
USPC ................................... 174/117 FF
See application file for complete search history.

(56) References Cited

U.S. PATENT DOCUMENTS 3,737,478 A 6/1973 Boldebuck
2014/0054062 A1* 2/2014 Yoshida ............... C09D 179/08
174/110 SR (Continued)

FOREIGN PATENT DOCUMENTS

EP 3418336 A1 12/2018
JP 2005-174561 A 6/2005
(Continued)

OTHER PUBLICATIONS

Extended European Search Report dated Jul. 17, 2018 for the corresponding European Patent Application No. 18164213.3.
(Continued)

*Primary Examiner* — Chau N Nguyen
(74) *Attorney, Agent, or Firm* — Leason Ellis LLP (57) ABSTRACT

This insulated flat conductive wire includes: a flat conductive wire having an aspect ratio a/b of 12 or more, wherein the aspect ratio is a ratio of a length a of a long side of a rectangular cross-section to a length b of a short side thereof; and an insulating film which consists of a polyamide-imide resin or a polyimide resin and coats the flat conductive wire, wherein the insulating film has a film thickness t1 of 10 μm or more at a center portion of the long side of the rectangular cross-section, and the insulating film has a film thickness ratio t1/t2 of 0.80 to 1.35, and wherein the film thickness ratio t1/t2 is a ratio of the film thickness t1 at the center portion of the long side to a film thickness t2 at an edge portion of the long side of the rectangular cross-section.

10 Claims, 3 Drawing Sheets

(51) Int. Cl.
  *H01B 3/30* (2006.01)
  *H01F 41/12* (2006.01)
  *H01B 13/00* (2006.01)
  *H01F 5/06* (2006.01)
  *C25D 13/06* (2006.01)
  *C09D 5/44* (2006.01)

(52) U.S. Cl.
  CPC ............... *H01B 3/306* (2013.01); *H01B 7/08* (2013.01); *H01B 13/0016* (2013.01); *H01F 5/06* (2013.01); *H01F 41/12* (2013.01)

(56) References Cited

U.S. PATENT DOCUMENTS

2016/0307663 A1* 10/2016 Ikeda .................... H01B 13/065
2017/0088677 A1*  3/2017 Kondo ........................ C08J 3/16
2017/0213620 A1*  7/2017 Lausch ................ H01B 7/0018

FOREIGN PATENT DOCUMENTS

| JP | 2008-041568 A | 2/2008 |
| JP | 5994955 B | 9/2016 |
| WO | WO-2008/139991 A | 11/2008 |
| WO | WO 2016/015883 * | 2/2016 |
| WO | WO-2017/141885 A1 | 8/2017 |

OTHER PUBLICATIONS

Office Action dated Jun. 14, 2019 for the corresponding European Patent Application No. 18164213.3.

* cited by examiner

FIG. 3 ent INSULATED FLAT CONDUCTIVE WIRE HAVING HIGH ASPECT RATIO, METHOD FOR MANUFACTURING SAME, AND COIL

BACKGROUND OF THE INVENTION

Field of the Invention

The present invention relates to an insulated flat conductive wire which has a high aspect ratio and is used for a coil of a motor or the like, a method for manufacturing the same, and a coil.

The present application claims priority to Japanese Patent Application No. 2017-159701 filed on Aug. 22, 2017, the content of which is incorporated herein by reference.

Description of Related Art

In the related art, an insulated electric wire of which a surface is coated with an insulating film is used for a coil of a motor or the like. As methods for forming an insulating film on the surface of this wire, an immersion method, an extrusion coating method, and an electrodeposition method are known. Among these methods, the electrodeposition method is a method of causing a direct current to flow between an object to be coated, which is immersed in an electrodeposition solution, and an electrode inserted in the electrodeposition solution so that electrically-charged coating particles are deposited on the object to be coated; and thereby, an insulating film is formed.

The electrodeposition method is easier to coat an electric wire with a uniform film thickness than other methods. In addition, in the electrodeposition method, an insulating film having high corrosion resistance and high adhesiveness can be formed after baking. Due to these advantages, the electrodeposition method has attracted attention and various improvements have been made thereto. For example, a water dispersion type electrodeposition solution for forming an insulating film is known, which is used to form the insulating film with this electrodeposition method (see, for example, Patent Document 1).

This water dispersion type electrodeposition solution for forming an insulating film, which is described in Patent Document 1, contains polymer particles, an organic solvent, a basic compound, and water. The polymer particles include polyamide-imide and/or polyesterimide having no anionic group in their main chain, and the polymer particles have a median diameter (D50) of 0.05 to 0.5 µm based on the number of particles, and the amount of particles having sizes of 70% to 130% (falling within ±30%) of the median diameter (D50) is 50% or more of the total amount of the particles (based on the number of particles).

Therefore, Patent Document 1 describes the following. Various monomers can be used for synthesis of a polymer, and it is not necessary to perform an operation such as hot melting or the like when producing an electrodeposition solution, and therefore, the electrodeposition solution can be produced easily and inexpensively. It is easy to thicken an insulating film, and the electrodeposition solution also has excellent storage stability.

In the case where an insulating film having a relatively large thickness (for example, 10 µm or more) is formed on a flat conductive wire by using the water dispersion type electrodeposition solution for forming an insulating film which is described in Patent Document 1, a thickness dimension of the insulating film formed at an edge portion of the flat conductive wire may become larger than a thickness dimension of the insulating film formed at a center portion of the flat conductive wire as the aspect ratio of the flat conductive wire increases (for example, 12 or more). In a coil obtained by winding (coiling) this flat conductive wire, a gap is formed between the insulating films, which is not preferable from the viewpoint of a space factor.

Therefore, an insulated flat conductive wire having a high aspect ratio with a uniform insulating film formed on a periphery (surface) of the conductive wire and a method for manufacturing the same are desired.

PRIOR ART DOCUMENT

Patent Document

Patent Document 1: Japanese Patent No. 5994955

SUMMARY OF THE INVENTION

Problems to be Solved by the Invention

The invention has been made in view of such circumstances, and an object thereof is to provide an insulated flat conductive wire having a high aspect ratio with a uniform insulating film formed on a periphery (surface) of the conductive wire, a method for manufacturing the same, and a coil having high insulation properties.

Solution for Solving the Problem

An insulated flat conductive wire having a high aspect ratio according to one aspect of the invention includes: a flat conductive wire having an aspect ratio a/b of 12 or more, wherein the aspect ratio is a ratio of a length a of a long side of a rectangular cross-section to a length b of a short side thereof; and an insulating film which consists of a polyamide-imide resin or a polyimide resin and coats the flat conductive wire, wherein the insulating film has a film thickness t1 of 10 µm or more at a center portion of the long side of the rectangular cross-section, and the insulating film has a film thickness ratio t1/t2 of 0.80 to 1.35, and wherein the film thickness ratio t1/t2 is a ratio of the film thickness t1 at the center portion of the long side to a film thickness t2 at an edge portion of the long side of the rectangular cross-section.

In the insulated flat conductive wire according to one aspect of the invention, the film thickness of the insulating film is 10 µm or more, and the film thickness ratio of the film thickness at the center portion of the long side of the rectangular cross-section in the flat conductive wire to the film thickness at the edge portion of the long side thereof is small. That is, the conductive wire according to one aspect of the invention is an insulated flat conductive wire having a high aspect ratio with a uniform insulating film formed on a periphery (surface) of the conductive wire. Therefore, it is possible to limit the formation of a gap between the insulating films in a coil obtained by coiling (winding) this insulated flat conductive wire; and thereby, a space factor can be improved. In addition, since the film thickness of the insulating film is 10 µm or more, insulation properties of the insulated flat conductive wire having a high aspect ratio can be enhanced.

In the insulated flat conductive wire having a high aspect ratio according to one aspect of the invention, it is preferable that the polyamide-imide resin or the polyimide resin has a number average molecular weight Mn of $2.0 \times 10^4$ to $4.0 \times 10^4$.

In the aspect, since the polyamide-imide or the polyimide has a number average molecular weight Mn of $2.0\times10^4$ to $4.0\times10^4$, an insulating film of a uniform thickness can be formed.

A coil according to one aspect of the invention includes the insulated flat conductive wire having a high aspect ratio which is coiled.

The above-described insulated flat conductive wire is an insulated flat conductive wire having a high aspect ratio with a uniform insulating film formed on a periphery (surface) of the conductive wire. Thus, no gap is formed between the insulating films in the coil obtained by coiling (winding) the insulated flat conductive wire. Accordingly, a space factor of the insulated flat conductive wire in the coil can be improved.

A method for manufacturing an insulated flat conductive wire having a high aspect ratio according to one aspect of the invention includes: an electrodeposition solution preparation step of mixing a polyamide-imide resin or a polyimide resin having a number average molecular weight Mn of $2.0\times10^4$ to $4.0\times10^4$, a polar organic solvent, and a base, stirring the mixture at a temperature of 20° C. to 25° C. for 3 hours or more to obtain a mixed solution, and subsequently adding water to the mixed solution to prepare an electrodeposition solution; an electrodeposition step of immersing a flat conductive wire having an aspect ratio a/b of 12 or more in the electrodeposition solution, wherein the aspect ratio is a ratio of a length a of a long side of a rectangular cross-section to a length b of a short side thereof, and causing a direct current to flow at a voltage of 150 V or higher in the electrodeposition solution, thereby electrodepositing particles of the polyamide-imide resin or the polyimide resin on a surface of the flat conductive wire; and a baking step of heating the flat conductive wire, on which the particles of the polyamide-imide resin or the polyimide resin have been electrodeposited, to form an insulating film on the surface of the flat conductive wire.

In the aspect of the invention, the polyamide-imide resin or the polyimide resin constituting the electrodeposition solution has a number average molecular weight Mn of $2.0\times10^4$ to $4.0\times10^4$. When the flat conductive wire is immersed in this electrodeposition solution and a direct current is caused to flow therein, an electric field concentrates on the edge portion of the long side of the rectangular cross-section in the flat conductive wire. As a result, electrically-charged particles of the polyamide-imide resin or the polyimide resin are electrodeposited on the edge portion. Since the polyamide-imide resin or the polyimide resin has a large number average molecular weight Mn, an electric resistance of the edge portion on which these particles are electrodeposited is increased depending on the amount of electrodeposition. Then, when the electric resistance of the edge portion of the long side of the rectangular cross-section becomes larger than an electric resistance of the center portion in the long side of the rectangular cross-section, particles of the polyamide-imide resin or the polyimide resin are electrodeposited at or in the vicinity of the center portion where an electric resistance is small. As a result, the particles of the polyamide-imide resin or the polyimide resin are electrodeposited evenly (uniformly) on a periphery (surface) of the flat conductive wire (film thickness saturation). By baking the flat conductive wire in which such film thickness saturation has occurred, it is possible to manufacture an insulated flat conductive wire having a high aspect ratio with a uniform insulating film formed on a periphery (surface) of the conductive wire.

On the other hand, in the case where the number average molecular weight Mn of the polyamide-imide resin or the polyimide resin constituting the electrodeposition solution is less than $2.0\times10^4$, an electric resistance at the edge portion is less likely (unlikely) to be higher than an electric resistance at the center portion even when a large amount of the particles are electrodeposited on the edge portion because the number average molecular weight Mn of the polyamide-imide resin or the polyimide resin is small. Therefore, a large amount of the polyamide-imide resin or the polyimide resin is electrodeposited on the edge portion of the long side of the rectangular cross-section in the flat conductive wire, and a small amount of the polyamide-imide resin or the polyimide resin is electrodeposited on the center portion thereof. As a result, a film thickness distribution of the insulating film coated on a periphery (surface) of the conductive wire is increased (widened), and thus the insulating film is less likely (unlikely) to be uniform. In addition, in the case where the number average molecular weight Mn of the polyamide-imide resin or the polyimide resin is more than $4.0\times10^4$, the viscosity of the polyamide-imide resin or the polyimide resin is high, and thus a stable synthesis cannot be performed.

In the electrodeposition solution containing a polyamide-imide resin or a polyimide resin having a number average molecular weight Mn of $2.0\times10^4$ to $4.0\times10^4$, a polar organic solvent, water and a base, a neutralization reaction between the base and the polyamide-imide resin or the polyimide resin cannot be reliably carried out merely by simply stirring the polyamide-imide resin or the polyimide resin, the polar organic solvent, the base, and water. Therefore, a storage stability of the electrodeposition solution is decreased. In the case where this neutralization reaction is not reliably carried out, the base continues to decompose the polymeric polyamide-imide resin or the polyimide resin in the electrodeposition solution. As a result, a molecular weight of the polyamide-imide resin or the polyimide resin is decreased over time. Therefore, in the case where a flat conductive wire is immersed in a deteriorated electrodeposition solution (for example, an electrodeposition solution which has been stored for one month or more from the date of production thereof) and a direct current is caused to flow at the voltage (150 V or more), a polyamide-imide resin or a polyimide resin having a low molecular weight is electrodeposited on the flat conductive wire, and the uniformity of the film thickness distribution of the insulating film is decreased as described above.

In contrast, in the aspect of the invention, the polyamide-imide resin or the polyimide resin, the polar organic solvent, and the base are mixed and stirred at a temperature of 20° C. to 25° C. for 3 hours or more. Therefore, in the electrodeposition solution, a neutralization reaction between the base and the polyamide-imide resin or the polyimide resin is reliably carried out. As a result, the electrodeposition solution does not deteriorate even in the case where a certain amount of time has passed from the date of production thereof. Thus, a storage stability of the electrodeposition solution can be enhanced. For example, even with an electrodeposition solution which has been stored for one month or more from the date of production thereof, an insulated flat conductive wire having a high aspect ratio with a uniform insulating film formed on a periphery (surface) of the conductive wire can be suitably manufactured.

In the method for manufacturing an insulated flat conductive wire having a high aspect ratio according to the aspect of the invention, it is preferable that the baking step includes: a low-temperature heating step of heating the flat conductive wire, on which the particles of the polyamide-imide resin or the polyimide resin have been electrodeposited, at a low temperature of 150° C. to 220° C. for 0.25 to 30 minutes; and a high-temperature heating step of heating the flat conductive wire, which has been heated at the low temperature, at a high temperature that is 30° C. or more higher than the temperature in the low-temperature heating step for 0.25 to 30 minutes.

The flat conductive wire on which the particles of the polyamide-imide resin or the polyimide resin have been electrodeposited has a high aspect ratio. Thus, a surface area thereof is larger than that of a common conducting wire. Therefore, in the case where the flat conductive wire is rapidly heated at a high temperature, a temperature thereof is easily increased, and thus components (for example, the polar organic solvent or water) other than the polyamide-imide resin or the polyimide resin which are electrodeposited on the periphery (surface) of the flat conductive wire may be rapidly volatilized to foam; and thereby, it becomes difficult to keep a film thickness of the insulating film uniform.

In contrast, in the above-described aspect, the polyamide-imide resin or the polyimide resin is heated at a low temperature of 150° C. to 220° C. for 0.25 to 30 minutes. Therefore, it is possible to volatilize at least a part of the components other than the polyamide-imide resin or the polyimide resin which are electrodeposited on the periphery (surface) of the flat conductive wire. Then, after the above-described components are volatilized, the flat conductive wire, which has been heated at the low temperature, is heated at a high temperature that is 30° C. or more higher than the temperature in the low-temperature heating step for 0.25 to 30 minutes. Therefore, the baking can be performed while suppressing foaming due to the components other than the polyamide-imide resin or the polyimide resin in the high-temperature heating step. As a result, it is possible to keep a film thickness of the insulating film of the insulated flat conductive wire having a high aspect ratio to be more uniform.

Effects of the Invention

According to the aspect of the invention, it is possible to provide an insulated flat conductive wire having a high aspect ratio and a coil having high insulation properties. In particular, according to the aspect of the invention, even in the case where the flat conductive wire has a high aspect ratio, it is possible to provide an insulated flat conductive wire which includes an insulating film having a uniform thickness on a surface of the conductive wire and which has high insulation properties. In addition, it is possible to provide a coil in which almost no gap is formed between the insulating films and a space factor of the insulated flat conductive wire is enhanced.

DETAILED DESCRIPTION OF THE INVENTION

Figure 1:
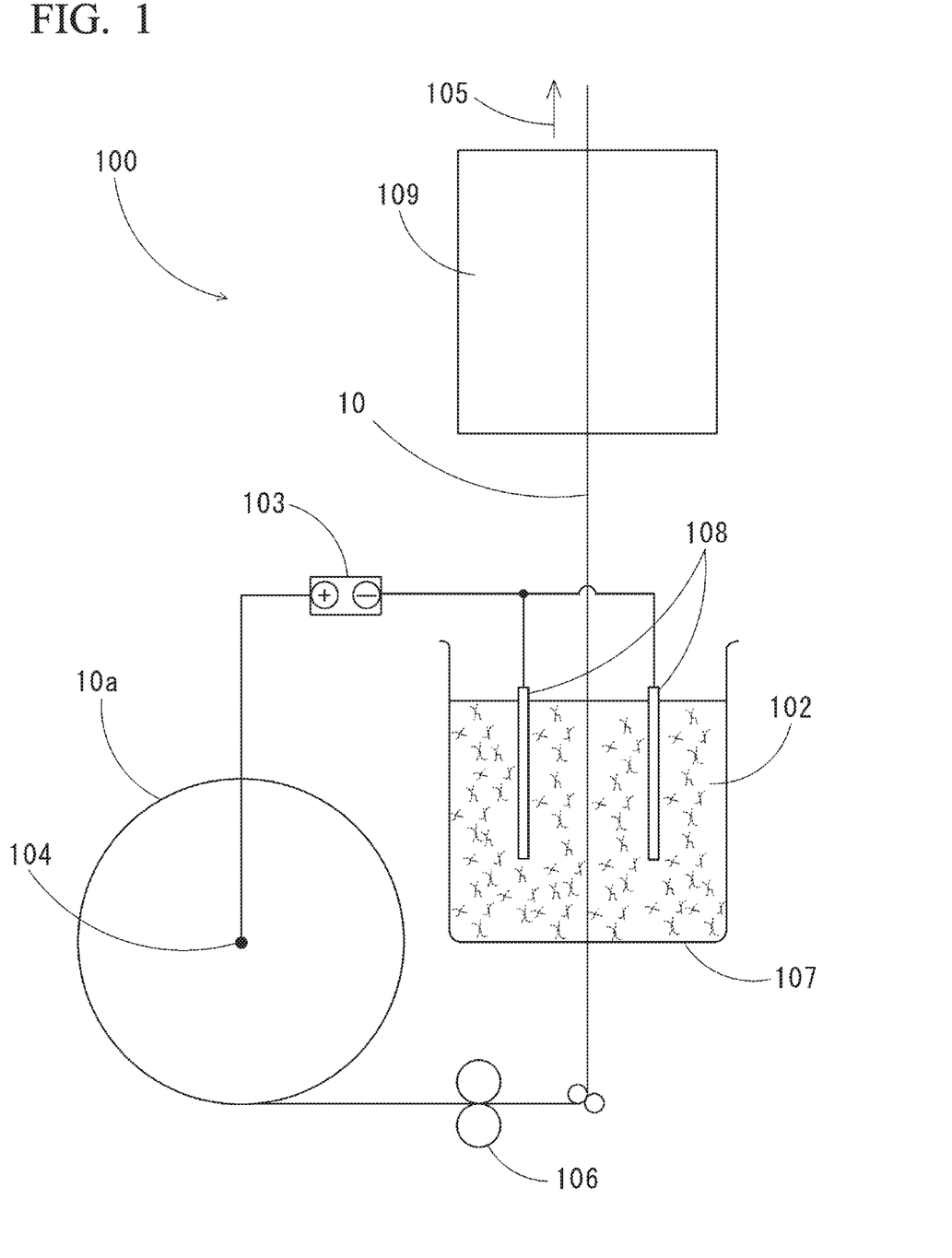
FIG. 1 is a schematic diagram showing an electrodeposition coating apparatus according to the present embodiment.
Figure 2:
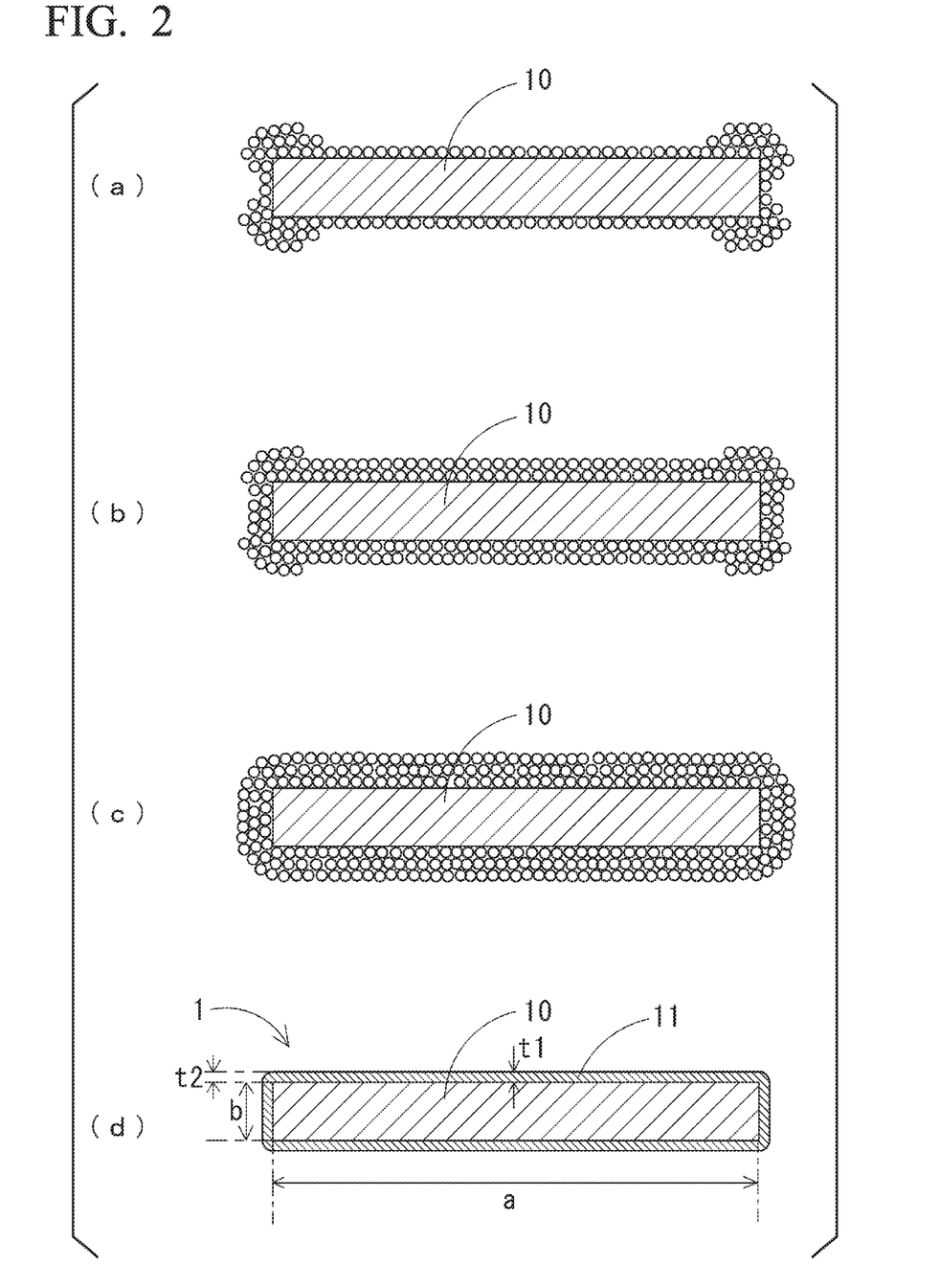
FIG. 2 is a schematic diagram showing, in a stepwise manner, how an insulating film is formed on a flat conductive wire by the electrodeposition coating apparatus in the present embodiment.

Hereinafter, an insulated flat conductive wire having a high aspect ratio according to an embodiment of the invention and a method for manufacturing the same will be described with reference to the drawings. FIGS. 1 and 2 are schematic diagrams. For example, an aspect ratio of a flat conductive wire 10, a thickness of an insulating film 11, and the like may be partially different from the actual ones in consideration of viewability of the drawings.

[Configuration of Insulated Flat Conductive Wire]

As shown in FIG. 2(d), an insulated flat conductive wire 1 having a high aspect ratio according to the present embodiment includes the flat conductive wire 10 and the insulating film 11 formed on a periphery (surface) of the flat conductive wire 10. This insulated flat conductive wire 1, for example, is coiled (wound) to form a coil (not shown).

[Configuration of Flat Conductive Wire]

The flat conductive wire 10 is formed of tough pitch copper or oxygen-free copper. In the flat conductive wire 10, an aspect ratio a/b is set to 12 to 60, and the aspect ratio a/b is a ratio of a length a of a long side of a rectangular cross-section (cross-section perpendicular to the longitudinal direction of the flat conductive wire) in the flat conductive wire 10 to a length b of a short side thereof. In addition, in the flat conductive wire 10, a cross-sectional area thereof is set so that a diameter (round wire-converted diameter) of a round wire having the same cross-sectional area as the rectangular cross-section becomes 0.5 mm to 4.5 mm.

An insulating film of the present embodiment can be formed even in the case where a round wire-converted diameter is less than 0.5 mm or more than 4.5 mm. However, as a flat conductive wire used for coils for automotive applications such as a reactor, a main motor, and an inductor, a conductive wire having the round wire-converted diameter of 0.5 mm to 4.5 mm is suitable.

[Configuration of Insulating Film]

The insulating film 11 consists of a polyamide-imide resin or a polyimide resin and is a film formed on the flat conductive wire 10 by an electrodeposition method. This insulating film 11 has a film thickness t1 of 10 μm to 100 μm at a center portion of the long side of the rectangular cross-section in the flat conductive wire 10, and the insulating film 11 has a film thickness ratio t1/t2 of 0.80 to 1.35. The film thickness ratio t1/t2 is a ratio of the film thickness t1 at the center portion of the long side thereof to a film thickness t2 at an edge portion (end portion) of the long side of the rectangular cross-section. The film thickness ratio t1/t2 is preferably in a range of 0.98 to 1.30.

The film thickness t1 at the center portion of the long side is an average value of two locations at an upper side and a lower side in the center portion of the long side, and the film thickness t2 is an average value of four locations at upper sides and lower sides in both edge portions of the long side. In addition, the film thickness t2 at the edge portion of the long side refers to the thickest part where roundness disappears in the edge portion of the insulating film 11, and the long side of the flat conductive wire 10 and a surface of the insulating film 11 begin to be parallel to each other.

A number average molecular weight Mn of the polyamide-imide resin or the polyimide resin constituting the insulating film 11 is $2.0 \times 10^4$ to $4.0 \times 10^4$. In the case where the number average molecular weight Mn is less than $2.0 \times 10^4$, the insulating film 11 having a uniform thickness cannot be provided. On the other hand, in the case where the number average molecular weight Mn is more than $4.0 \times 10^4$, the viscosity of the polyamide-imide resin or the polyimide resin becomes high, and thus a stable synthesis cannot be performed.

Therefore, in the present embodiment, the number average molecular weight Mn of the polyamide-imide resin or the polyimide resin constituting the insulating film 11 is set within the above-described range. Thus, the thickness of the insulating film 11 can be made uniform; and thereby, insulation properties of the insulated flat conductive wire 1 are improved.

[Method for Manufacturing Insulated Flat Conductive Wire]

A method for manufacturing this insulated flat conductive wire 1 will be described. In the manufacturing method, a description will be provided with a resin contained in the electrodeposition solution being a polyamide-imide resin.

The manufacturing method of the present embodiment includes: an electrodeposition solution preparation step of preparing an electrodeposition solution; a rolling step of rolling a conductive wire having a circular cross-section to form a flat conductive wire; an electrodeposition step of electrodepositing particles of a polyamide-imide resin on a periphery (surface) of the flat conductive wire; and a baking step of baking the flat conductive wire, on which the particles of the polyamide-imide resin have been electrodeposited, to form an insulating film on the periphery (surface) of the flat conductive wire.

Steps thereof will be described below in this order.

[Electrodeposition Solution Preparation Step]

In the electrodeposition solution preparation step, the electrodeposition solution is produced (prepared) by the following method.

First, N-methyl-2-pyrrolidone (NMP), 4,4-diphenylmethane diisocyanate, and trimellitic anhydride are mixed at predetermined ratios to prepare a mixed solution. Subsequently, the mixed solution is heated to a temperature of 40° C. to 60° C. and stirred at this temperature for 1 to 2 hours. Then, the mixed solution is heated to a temperature of 170° C. to 180° C. and is kept at this temperature for 2 to 5 hours to be allowed to react. Subsequently, the resulting solution was cooled to 40° C. to 80° C. As a result, a mixed solution containing a polyamide-imide resin (PAI) is obtained. Subsequently, the mixed solution is further diluted with a polar organic solvent, and predetermined amounts of a poor solvent and a base are added to the diluted mixed solution, and the resulting solution is stirred at room temperature (20° C. to 25° C.) for 3 hours or more.

It is considered that as the number average molecular weight Mn of the polyamide-imide resin is increased, the reactivity of a neutralization reaction between a carboxyl group of the polyamide-imide resin and the base is decreased. Therefore, in the present embodiment, a polyamide-imide resin having a number average molecular weight Mn of $2.0 \times 10^4$ to $4.0 \times 10^4$, a polar organic solvent, and a base are mixed and a sufficient stirring treatment is performed for 3 hours or more; and thereby, the decrease of a storage stability of the electrodeposition solution to be produced is prevented.

Then, a predetermined amount of water is added dropwise while stirring the mixed solution, which has been obtained by stirring for a long period of time, at a rotation speed of 8000 to 12000 rpm. Thereby, an electrodeposition solution in which particles of the polyamide-imide resin are dispersed is obtained.

The thus produced electrodeposition solution contains a polyamide-imide resin having a number average molecular weight Mn of $2.0 \times 10^4$ to $4.0 \times 10^4$, a polar organic solvent, a base, and water.

Proportions of the respective components in the electrodeposition solution are as follows: 1 to 10% by mass of the polyamide-imide resin, 70 to 79% by mass of the polar organic solvent, 0.01 to 0.1% by mass of the base, and the remainder of water.

[Configuration of Electrodeposition Coating Apparatus]

The rolling step, the electrodeposition step, and the baking step are carried out by an electrodeposition coating apparatus 100 shown in FIG. 1. The electrodeposition coating apparatus 100 includes: a conductive wire 10a coiled (wound) in a cylindrical shape and having a circular cross-section; a pair of rolling rollers 106 for rolling the conductive wire 10a; an electrodeposition bath 107 for electrodepositing the polyamide-imide resin on the rolled conductive wire 10a; and a baking furnace 109 for heating the conductive wire 10a on which the polyamide-imide resin is electrodeposited. An anode 104 connected to a positive electrode of a DC power supply 103 is provided on the conductive wire 10a. In addition, a cathode 108 (electrode) is connected to a negative electrode of the DC power supply 103, and this electrode is inserted into an electrodeposition solution 102 in the electrodeposition bath 107.

The conductive wire 10a is pulled up in a direction of an arrow 105, and various treatments are executed.

[Rolling Step]

The conductive wire 10a coiled (wound) into a cylindrical shape is rolled to have a flat-shape cross-section by a pair of rolling rollers 106, and it becomes a flat-shape conductive wire (the above-described flat conductive wire 10).

[Electrodeposition Step]

Then, the flat conductive wire 10 passes through the inside of the electrodeposition bath 107 filled with the electrodeposition solution 102. The electrodeposition solution 102 is disposed such that a periphery of the flat conductive wire 10 is surrounded by the electrodeposition solution 102 when the flat conductive wire 10 passes through the electrodeposition bath 107. When the flat conductive wire 10 passes through the electrodeposition bath 107, particles of the polyamide-imide resin dispersed in the electrodeposition solution 102 are electrodeposited on a surface of the flat conductive wire 10 as shown in FIG. 2(c) because a DC voltage is applied from the anode 104.

Specifically, when the flat conductive wire 10 is immersed in the electrodeposition solution 102 and a direct current is caused to flow therein, an electric field concentrates on the edge portion of the long side of the rectangular cross-section in the flat conductive wire 10. Therefore, as shown in FIG. 2(a), electrically-charged particles of the polyamide-imide resin are electrodeposited on the edge portion of the flat conductive wire 10. The polyamide-imide resin has a large number average molecular weight Mn. Thus, an electric resistance at the edge portion where these particles are electrodeposited (electric resistance of a wet film formed of the particles of the polyamide-imide resin) is increased depending on an electrodeposition amount of the particles. Then, when the electric resistance at the edge portion of the long side of the rectangular cross-section becomes larger than the electric resistance at the center portion of the long side of the rectangular cross-section, the particles of the polyamide-imide resin are electrodeposited at or in the vicinity of the center portion where the electric resistance is small as shown in FIG. 2(b). As a result, as shown in FIG. 2(c), the particles of the polyamide-imide resin are electrodeposited evenly (uniformly) on the periphery (surface) of the flat conductive wire 10 (film thickness saturation).

A temperature of the electrodeposition solution 102 is preferably within a range of 5° C. to 60° C. In addition, a DC voltage is preferably within a range of 150 V or more, and a deposition time is preferably within a range of 5 to 60 seconds. In addition, the reason why the DC voltage is set within the above-described range is as follows. The wet film is formed of the particles of the polyamide-imide resin electrodeposited on the flat conductive wire 10. In the case where the DC voltage is less than 150 V, the amount of a polar solvent (polar organic solvent or water) in the wet film is increased, and thus foaming cannot be suppressed in a subsequent baking step.

Figure 3:
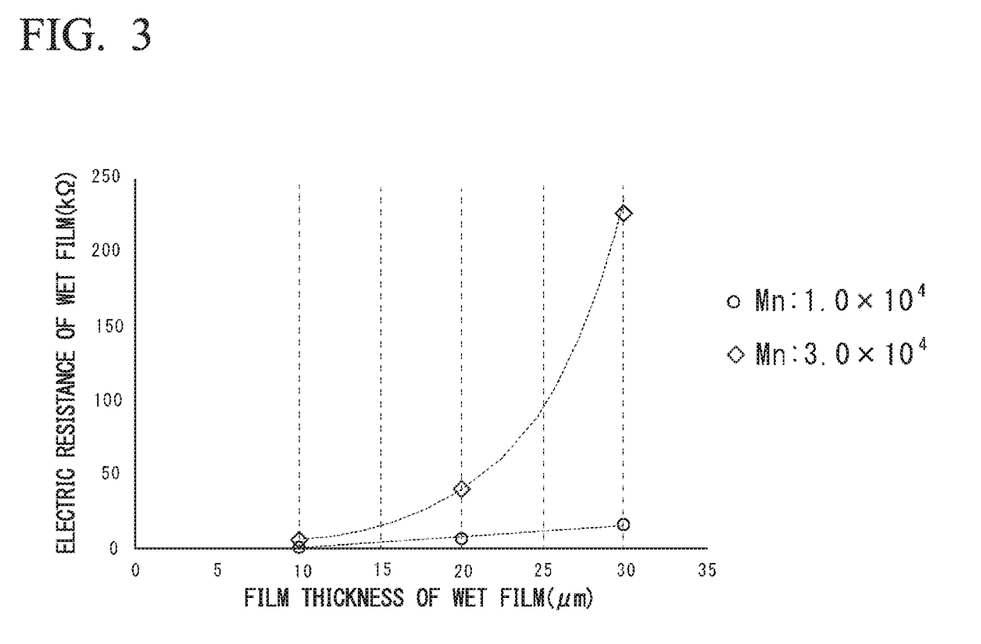
FIG. 3 is a graph showing a relationship between a film thickness of a wet film formed of particles of the polyamide-imide resin in the electrodeposition solution and an electric resistance of the wet film, depending on a number average molecular weight Mn of the polyamide-imide resin in the present embodiment.

FIG. 3 is a graph showing a relationship between a film thickness of the wet film formed of the particles of the polyamide-imide resin in the electrodeposition solution and an electric resistance of the wet film, depending on a number average molecular weight Mn of the polyamide-imide resin.

In the case where the number average molecular weight Mn of the polyamide-imide resin is $1.0 \times 10^4$ (in the case where the number average molecular weight Mn of the polyamide-imide resin constituting the electrodeposition solution is less than $2.0 \times 10^4$), if there is a carboxyl group at both terminals of the polyamide-imide resin, the amount of functional groups per weight is increased. Since these functional groups as polar groups interact with a polar solvent (polar organic solvent or water), a large amount of the polar solvent is included into the wet film after electrodeposition. With regard to the wet film containing a large amount of the polar solvent in this way, even in the case where the wet film is deposited on a surface of the flat conductive wire 10 and a film thickness thereof is increased, an electric resistance of the wet film is not greatly increased as shown in FIG. 3. Therefore, during the electrodeposition, an electric field continues to concentrate on the edge portion of the flat conductive wire 10, and a shape of the wet film electrodeposited on the flat conductive wire 10 becomes a so-called dog-bone shape. Even in the case where this wet film is heated in the baking step, a film thickness distribution of the insulating film 11 is increased (widened). In other words, the difference between a film thickness at the center portion of the long side of the rectangular cross-section and a film thickness at the edge portion of the long side thereof is increased. In addition, in the case where the number average molecular weight Mn of the polyamide-imide resin is small, the amount of the polar solvent in the wet film is increased, and thus foaming cannot be suppressed in the baking step.

On the other hand, in the case where the number average molecular weight Mn of the polyamide-imide resin is $3.0 \times 10^4$ (in the case where the number average molecular weight Mn of the polyamide-imide resin constituting the electrodeposition solution is $2.0 \times 10^4$ to $4.0 \times 10^4$), an electric resistance of the wet film is increased exponentially as a film thickness of the wet film formed of the particles of the polyamide-imide resin becomes thick.

From these, in the case where the number average molecular weight Mn of the polyamide-imide resin constituting the electrodeposition solution 102 is less than $2.0 \times 10^4$, due to a small number average molecular weight Mn of the polyamide-imide resin, an electric resistance at the edge portion (electric resistance of the wet film at the edge portion) is less likely (unlikely) to be higher than an electric resistance at the center portion even in the case where a large amount of the particles are electrodeposited on the edge portion. Therefore, a large amount of the particles of the polyamide-imide resin are electrodeposited on the edge portion of the long side of the rectangular cross-section in the flat conductive wire 10, and a small amount of the particles of the polyamide-imide resin are electrodeposited on the center portion thereof. As a result, the film thickness distribution of the insulating film coated on the periphery (surface) of the flat conductive wire 10 is increased (widened), and thus the film thickness of the insulating film 11 is less likely (unlikely) to be uniform. In addition, in the case where the number average molecular weight Mn of the polyamide-imide resin or the polyimide resin is more than $4.0 \times 10^4$, the viscosity of the polyamide-imide resin or the polyimide resin is high, and thus a stable synthesis cannot be performed.

Therefore, the number average molecular weight Mn of the polyamide-imide resin in the electrodeposition solution 102 is set to be in a range of $2.0 \times 10^4$ to $4.0 \times 10^4$.

In the electrodeposition solution preparation step, the polyamide-imide resin or the polyimide resin, the polar organic solvent, and the base are mixed and stirred at a temperature of 20° C. to 25° C. for a long period of time which is 3 hours or more. Thus, in the electrodeposition solution 102, a neutralization reaction between the base and the polyamide-imide resin or the polyimide resin is reliably performed. As a result, the electrodeposition solution 102 does not deteriorate even in the case where a certain amount of time has passed from the date of production thereof. Thus, a storage stability of the electrodeposition solution 102 can be enhanced. For example, even with the electrodeposition solution 102 which has been stored for one month or more from the date of production thereof, the insulated flat conductive wire 1 in which a uniform insulating film 11 is formed on the periphery (surface) of the flat conductive wire 10 can be suitably manufactured.

[Baking Step]

In the baking step, the flat conductive wire 10 pulled out of the electrodeposition bath 107 passes through the baking furnace 109, and the polyamide-imide resin electrodeposited on the flat conductive wire 10 is baked on the flat conductive wire 10 to form the insulating film 11.

Specifically, the baking step includes: a low-temperature heating step of heating the flat conductive wire 10, on which the particles of the polyamide-imide resin have been electrodeposited, at a low temperature of 150° C. to 220° C. for 0.25 to 30 minutes; and a high-temperature heating step of heating the flat conductive wire 10, which has been heated at the low temperature, at a high temperature that is 30° C. or more higher than the temperature in the low-temperature heating step for 0.25 to 30 minutes.

The flat conductive wire 10, on which the particles of the polyamide-imide resin have been electrodeposited, has a high aspect ratio, and thus has a larger surface area than a common conductive wire. Therefore, when the flat conductive wire 10 is rapidly heated at a high temperature, a temperature thereof is easily increased, and components (for example, polar organic solvent and water) other than the polyamide-imide resin which are electrodeposited on the periphery (surface) of the flat conductive wire 10 are rapidly volatilized to foam. Therefore, it is difficult to keep a film thickness of the insulating film 11 uniform.

In contrast, in the present embodiment, the polyamide-imide resin is first heated at a low temperature of 150° C. to 220° C. for 0.25 to 30 minutes. Therefore, at least a part of the components other than the polyamide-imide resin which are electrodeposited on the periphery (surface) of the flat conductive wire 10 can be volatilized. Then, after the above-described components are volatilized, the flat conductive wire, which has been heated at the low temperature, is heated at a high temperature that is 30° C. or more higher than the temperature of the low-temperature heating step for 0.25 to 30 minutes. Therefore, the foaming due to the components other than the polyamide-imide resin can be suppressed in the high-temperature heating step. As a result, it is possible to keep a film thickness of the insulating film 11 of the insulated flat conductive wire 1 to be more uniform.

In the case where a heating time is less than 0.25 minutes in both the low-temperature heating step and the high-temperature heating step, components (for example, polar organic solvent or water) other than the polyamide-imide resin which are electrodeposited on the periphery (surface) of the flat conductive wire 10 may not be sufficiently volatilized, and a breakdown voltage of the insulating film may be decreased. On the other hand, in the case where the heating time is more than 30 minutes in both the low-temperature heating step and the high-temperature heating step, the resin may deteriorate.

The insulated flat conductive wire 1 manufactured in this way has the above-described configuration (features), and this insulated flat conductive wire 1 is coiled (wound) and used as a coil.

The insulated flat conductive wire 1 of the present embodiment is a conductive wire having a high aspect ratio and including a uniform insulating film formed on the periphery (surface) of the flat conductive wire 10. Therefore, in a coil obtained by winding (coiling) the insulated flat conductive wire 1, it is possible to suppress the formation of a gap between the insulating films; and thereby, a space factor can be improved. In addition, since the film thickness of the insulating film is 10 μm or more, insulation properties of the flat conductive wire having a high aspect ratio can be enhanced.

In addition, since the thickness of the insulating film 11 can be uniform, the insulation properties of the insulated flat conductive wire 1 can be further enhanced.

The present invention is not limited to the above-described embodiment, and various modifications can be made within a scope that does not depart from the features of the present invention.

In the above-described embodiment, the electrodeposition solution 102 contains a polyamide-imide resin having a number average molecular weight Mn of $2.0 \times 10^4$ to $4.0 \times 10^4$. However, the present invention is not limited thereto, and the electrodeposition solution 102 may contain a polyimide resin having a number average molecular weight Mn of $2.0 \times 10^4$ to $4.0 \times 10^4$. Even in this case, the same effects as those of the above-described embodiment can be achieved.

In the embodiment, as shown in FIG. 1, an example is explained in which the electrodeposition coating apparatus 100 executes steps of rolling, electrodepositing, baking, and the like continuously in a longitudinal direction. However, the present invention is not limited thereto, and the respective steps may be executed in a horizontal direction or may be executed by a method such as a batch method in which one step is performed and then the next step is performed. In addition, in the above-described embodiment, the rolling step is performed in the method for manufacturing an insulated flat conductive wire. However, for example, the rolling step may be omitted. In this case, a conductive wire which has been formed to have a flat-shape cross-section in advance may be supplied as it is.

EXAMPLES

Electrodeposition solutions were prepared while changing various conditions, and an insulated flat conductive wire was manufactured using each of these electrodeposition solutions. Then, experiments were conducted regarding a storage stability of the electrodeposition solution, and a film thickness (presence or absence of foaming) and a breakdown voltage of an insulating film of the insulated flat conductive wire. The obtained samples of Examples 1 to 6, Comparative Examples 1 to 3, and Reference Example 1 will be described with reference to Tables 1 and 2.

Example 1

First, in a 2 liter four-neck flask equipped with a stirrer, a cooling tube, a nitrogen inlet tube, and a thermometer, 320 g (3.23 mol) of N-methyl-2-pyrrolidone (NMP), 181 g (0.72 mol) of 4,4-diphenylmethane diisocyanate, and 139 g (0.72 mol) of trimellitic anhydride were mixed to prepare a mixed solution. The mixed solution was heated to 60° C. and stirred at this temperature for 1 hour. Subsequently, this mixed solution was heated to 180° C., and the mixed solution was kept at this temperature for 2 hours to be allowed to react and then cooled to 60° C. Then, 960 g (9.68 mol) of N-methyl-2-pyrrolidone (NMP) as a polar organic solvent was added to this cooled mixed solution; and thereby, the cooled mixed solution was further diluted to obtain a mixed solution containing polyamide-imide (PAI) of which a number average molecular weight Mn was $3.0 \times 10^4$ and having a non-volatile content of 20% by mass as shown in Table 1.

2.5 g of this mixed solution (PAI:NMP=20% by mass: 80% by mass) was further diluted with 1,3-dimethyl-2-imidazolidinone (DMI). Subsequently, 0.8 g of 1-methoxypropanol (1M2P) as a poor solvent and 0.015 g of tripropylamine (TPA) as a base were added to this diluted mixed solution, and the resultant solution was stirred at room temperature (20° C. to 25° C.) for a long period of time which was 3 hours or more. Then, while stirring the mixed solution at a high speed, 1.7 g of water was added dropwise to obtain an electrodeposition solution in which particles of the polyamide-imide resin were dispersed.

The number average molecular weight Mn was measured using a high-speed GPC apparatus (HLC-8320 GPC manufactured by Tosoh Corporation) in which a column (TSKgel Super AWM-H manufactured by Tosoh Corporation) having an exclusion limit molecular weight of $4 \times 10^7$ or more was utilized, and a numerical value detected by a differential refractive index detector (refractometer) was converted to standard polystyrene to measure a molecular weight. A flow rate was 0.600 cc/min, a control temperature was 40° C., a sampling rate was $5 \times 10^{-1}$ cc/sec, and a sample injection amount was 0.010 cc. 1 mmol of lithium bromide and 100 mmol of phosphoric acid as adsorption inhibitors were added to dimethylacetamide, and the resultant was used as a mobile phase. The number average molecular weight Mn was measured in the same manner in other Examples 2 to 6, Comparative Examples 1 to 3, and Reference Example 1. In the present Example, the number average molecular weight Mn was measured in the electrodeposition solution. However, the number average molecular weight Mn does not change even after formation of the insulating film. Thus, the number average molecular weight Mn may be measured after dissolving the insulating film in an appropriate solvent.

Next, an insulator was prepared using the electrodeposition solution. Specifically, at first, the electrodeposition solution was stored in an electrodeposition bath, and the temperature of the electrodeposition solution in this electrodeposition bath was set to 25° C. Subsequently, a copper plate (corresponding to the flat conductive wire of the embodiment and having an aspect ratio of 42.4) having a width of 17.8 mm, a thickness of 0.42 mm, and a length of 200 mm was prepared as an anode, and a stainless steel plate was prepared as a cathode. The copper plate and the stainless steel plate were inserted into the electrodeposition solution in the electrodeposition bath and held for 30 seconds in a state where a DC voltage of 500 V was applied between the copper plate and the stainless steel plate. As a result, a wet film was formed on a surface of the copper plate.

For Examples 2 and 3, Comparative Examples 1 to 3, and Reference Example 1, a copper plate having the same aspect ratio as that in Example 1 was used. For Example 5, a copper plate having an aspect ratio of 12 (width of 6.0 mm and thickness of 0.5 mm) was used. For Example 6, a copper plate having an aspect ratio of 60 (width of 18.0 mm and thickness of 0.3 mm) was used.

A film weight immediately after electrodeposition and a film weight after baking were measured using an electronic balance. Then, the film weight after baking was subtracted from the film weight immediately after electrodeposition to obtain the amount of solvent in the wet film. This amount of solvent in the wet film was measured in the same manner in other Examples 2 to 6, Comparative Examples 1 to 3, and Reference Example 1.

Next, the copper plate with the wet film formed on a surface thereof was subjected to a baking treatment. Specifically, the copper plate on which the wet film was formed was heated at 210° C. for 3 minutes (low-temperature heating step) and then heated at 300° C. for 3 minutes (high-temperature heating step). As a result, an insulator including an insulating film having a film thickness shown in Table 2 was obtained.

For Examples 2, 3, 5, and 6, and Comparative Examples 1 and 2, each of the electrodeposition solutions shown in Table 1 was produced in substantially the same manner as Example 1. In addition, in Example 4 and Comparative Example 3, although a detailed description is omitted, an electrodeposition solution was obtained in which particles of a polyimide resin are dispersed in place of the particles of the polyamide-imide resin. Furthermore, in Reference Example 1, the stirring for a long period of time was not performed in the method for manufacturing an electrodeposition solution unlike Example 1.

In addition, for Examples 2 to 6, Comparative Examples 1 to 3, and Reference Example 1, each of the thus produced electrodeposition solutions was used, and an electrodeposition voltage shown in Table 1 was applied between the copper plate and the stainless steel plate to form a wet film having the amount of solvent therein shown in Table 1. The copper plate on which the wet film was formed was heated at a baking temperature shown in Table 1.

Various evaluations for electrodeposition solutions obtained in Examples 1 to 6, Comparative Examples 1 to 3, and Reference Example 1, and insulators obtained by using the electrodeposition solutions were carried out in the following manner. The results are shown in Table 2.

[Storage Stability of Electrodeposition Solution]

The electrodeposition solution prepared (produced) in each of Examples 1 to 6, Comparative Examples 1 to 3, and Reference Example 1 was left to stand (stored) at room temperature (20° C. to 25° C.) for a certain period of time. Subsequently, presence or absence of precipitation was visually observed.

In this evaluation of the storage stability of the electrodeposition solution, cases where precipitation was not visually observed even after one month had passed from the preparation of the electrodeposition solution are indicated with an "A". Cases where no precipitation was observed after one week had passed from the preparation of the electrodeposition solution but precipitation was observed after one month had passed from the preparation thereof are indicated with a "B". Cases where precipitation was observed after one week had passed from the preparation of the electrodeposition solution are indicated with a "C".

[Average Film Thickness]

The average film thickness of the insulator (insulating film formed on a surface of the copper plate) produced using each of the electrodeposition solutions of Examples 1 to 6, Comparative Examples 1 to 3, and Reference Example 1 was measured. The average film thickness was an arithmetic mean value of the film thicknesses of two locations at an upper side and a lower side in a center portion of a long side of a rectangular cross-section of the copper plate, and four locations at upper sides and lower sides in both edge portions of the long side thereof. In addition, in the case where foaming of a wet film occurred in a baking step, an appropriate insulating film could not be obtained. Thus, the film thickness of the insulating film was not measured.

[Film Thickness Distribution]

The film thickness distribution in each of the insulating films of Examples 1 to 6, Comparative Examples 1 to 3, and Reference Example 1 was calculated. In this evaluation of the film thickness distribution, a film thickness ratio t1/t2 was calculated, and the film thickness ratio t1/t2 was the ratio of a film thickness t1 at the center portion of the long side of the rectangular cross-section of the copper plate to a film thickness t2 at the edge portion of the long side of the rectangular cross-section thereof.

[Breakdown Voltage]

Each of the insulating films of Examples 1 to 6, Comparative Examples 1 to 3, and Reference Example 1 was subjected to a breakdown voltage test. In this breakdown voltage test, a voltage was applied to the insulating film, the applied voltage was gradually increased, and a voltage at which abnormality occurred in the insulation properties was measured.

In the case where an insulating film was not appropriately formed in the bakingfc; step, the measurement of the breakdown voltage was not carried out, and this case is denoted as "ND" in Table 2.

TABLE 1

| | Resin species | Number average molecular weight (Mn) | Stirring for long period of time | Electrodeposition voltage (V) | Amount of solvent in wet film (% by mass) | Baking step | | | |
|---|---|---|---|---|---|---|---|---|---|
| | | | | | | Low-temperature heating step | | High-temperature heating step | |
| | | | | | | Temperature (° C.) | Time (min) | Temperature (° C.) | Time (min) |
| Example 1 | Polyamide-imide | $3.0 \times 10^4$ | Yes | 500 | 58 | 210 | 3 | 300 | 3 |
| Example 2 | Polyamide-imide | $3.0 \times 10^4$ | Yes | 250 | 62 | 210 | 3 | 300 | 3 |
| Example 3 | Polyamide-imide | $3.0 \times 10^4$ | Yes | 500 | 60 | 175 | 5 | 300 | 3 |

TABLE 1-continued

| | | | | | Amount of | Baking step | | | |
| | | | | | solvent in | Low-temperature heating step | | High-temperature heating step | |
| | | Number average | Stirring for | Electrodeposition | wet film | Temperature | Time | Temperature | Time |
| | Resin species | molecular weight (Mn) | long period of time | voltage (V) | (% by mass) | (° C.) | (min) | (° C.) | (min) |
|---|---|---|---|---|---|---|---|---|---|
| Example 4 | Polyimide | $2.6 \times 10^4$ | Yes | 500 | 60 | 210 | 3 | 320 | 5 |
| Example 5 | Polyamide-imide | $3.0 \times 10^4$ | Yes | 500 | 60 | 210 | 3 | 300 | 3 |
| Example 6 | Polyamide-imide | $3.0 \times 10^4$ | Yes | 500 | 59 | 210 | 3 | 300 | 3 |
| Comparative Example 1 | Polyamide-imide | $1.0 \times 10^4$ | Yes | 500 | 80 | 210 | 3 | 300 | 3 |
| Comparative Example 2 | Polyamide-imide | $1.0 \times 10^4$ | Yes | 100 | 85 | 175 | 3 | 300 | 3 |
| Comparative Example 3 | Polyimide | $1.2 \times 10^4$ | Yes | 500 | 78 | 210 | 3 | 320 | 5 |
| Reference Example 1 | Polyamide-imide | $3.0 \times 10^4$ | No | 500 | 58 | 210 | 3 | 300 | 3 |

TABLE 2

| | Storage stability of electrodeposition solution | Average film thickness (μm) | Film thickness distribution (film thickness ratio) | Breakdown voltage (kV) |
|---|---|---|---|---|
| Example 1 | A | 40 | 1.05 | 5.3 |
| Example 2 | A | 40 | 1.30 | 3.5 |
| Example 3 | A | 100 | 1.10 | 9.5 |
| Example 4 | A | 40 | 0.98 | 6.0 |
| Example 5 | A | 40 | 1.00 | 4.5 |
| Example 6 | A | 40 | 1.18 | 5.0 |
| Comparative Example 1 | B | Foaming (40 μm could not be obtained) | ND | ND |
| Comparative Example 2 | B | 10 | 1.55 | 1.2 |
| Comparative Example 3 | B to C | Foaming (40 μm could not be obtained) | ND | ND |
| Reference Example 1 | B | 40 | 1.40 | 5.5 |

In Examples 1 to 6, the number average molecular weight Mn of the polyamide-imide resin or the polyimide resin was $2.0 \times 10^4$ to $4.0 \times 10^4$. In these Examples 1 to 6, the film thickness distribution of the insulating film formed on the periphery (surface) of the copper plate was small. Among these, in Examples 1 and 3 to 6, due to their higher electrodeposition voltages than that in Example 2, the film thickness distribution of the insulating film was particularly small.

In addition, each of Examples 1 to 6 had a sufficiently high breakdown voltage which was 3.5 kV or more.

The storage stabilities of the electrodeposition solution were high in all of Examples 1 to 6, and no precipitation was observed even after being left to stand for one month or more. This is considered to be due to the fact that the stirring for a long period of time was performed in the electrodeposition solution preparation step and that the number average molecular weight Mn of the polyamide-imide resin or the polyimide resin was $2.0 \times 10^4$ to $4.0 \times 10^4$.

On the other hand, in each of Comparative Examples 1 to 3, the number average molecular weight Mn of the polyamide-imide resin or the polyimide resin was less than $2.0 \times 10^4$. Therefore, the amount of solvent in the wet film was increased, the film thickness of the insulating film could not be increased without the occurrence of foaming, and the insulating film could not be appropriately provided on the periphery (surface) of the copper plate. Accordingly, each of Comparative Examples 1 to 3 was inferior to Examples 1 to 6 in all of the film thickness distribution, the breakdown voltage, and the storage stability of the electrodeposition solution.

In addition, in Reference Example 1, the polyamide-imide resin had a number average molecular weight Mn of $2.0 \times 10^4$ to $4.0 \times 10^4$, and thus a good breakdown voltage was exhibited. However, the stirring for a long period of time was not performed during preparation of the electrodeposition solution. Thus, the film thickness distribution and the storage stability of the electrodeposition solution of Reference Example 1 were inferior to those of Examples 1 to 6.

INDUSTRIAL APPLICABILITY

According to the present embodiment, even in the case where a flat conductive wire has a high aspect ratio, it is possible to provide an insulated flat conductive wire including an insulating film of uniform thickness on a surface of the conductive wire and having high insulation properties. It is also possible to provide a coil in which a space factor of the insulated flat conductive wire is increased. Therefore, the present embodiment can be suitably applied to an insulated flat conductive wire which has a high aspect ratio and is used for a coil of a motor or the like, and a manufacturing method thereof.

EXPLANATION OF REFERENCES

1: Insulated flat conductive wire
10: Flat conductive wire
10a: Conductive wire
11: Insulating film
100: Electrodeposition coating apparatus
102: Electrodeposition solution
103: DC power supply
104: Anode
105: Arrow indicating direction in which conductive wire is pulled up
106: Rolling roller
107: Electrodeposition bath
108: Cathode
109: Baking furnace

What is claimed is:

1. An insulated flat conductive wire having a high aspect ratio, comprising:
   a flat conductive wire having an aspect ratio a/b of 12 or more, wherein the aspect ratio is a ratio of a length a of a long side of a rectangular cross-section to a length b of a short side thereof; and
   an insulating film which consists of a polyamide-imide resin and coats the flat conductive wire, wherein
   a cross-sectional area of the flat conductive wire is set so that a diameter of a round wire having the same cross-sectional area as the rectangular cross-section of the flat conductive wire becomes 0.5 mm to 4.5 mm,
   the polyamide-imide resin has a number average molecular weight Mn of $2.0 \times 10^4$ to $4.0 \times 10^4$ when converted to standard polystyrene, and
   the insulating film has a film thickness t1 of 10 μm or more at a center portion of the long side of the rectangular cross-section, and the insulating film has a film thickness ratio t1/t2 of 0.80 to 1.35, and wherein the film thickness ratio t1/t2 is a ratio of the film thickness t1 at the center portion of the long side to a film thickness t2 at an edge portion of the long side of the rectangular cross-section.

2. A coil comprising:
   the insulated flat conductive wire having a high aspect ratio according to claim 1 which is coiled.

3. A method for manufacturing the insulated flat conductive wire having a high aspect ratio according to claim 1, the method comprising:
   an electrodeposition solution preparation step of mixing a polyamide-imide resin having a number average molecular weight Mn of $2.0 \times 10^4$ to $4.0 \times 10^4$ when converted to standard polystyrene, a polar organic solvent, and a base, stirring the mixture at a temperature of 20° C. to 25° C. for 3 hours or more to obtain a mixed solution, and subsequently adding water to the mixed solution to prepare an electrodeposition solution;
   an electrodeposition step of immersing a flat conductive wire having an aspect ratio a/b of 12 or more in the electrodeposition solution, wherein the aspect ratio is a ratio of a length a of a long side of a rectangular cross-section to a length b of a short side thereof, and causing a direct current to flow at a voltage of 150 V or higher in the electrodeposition solution, thereby electrodepositing particles of the polyamide-imide resin on a surface of the flat conductive wire; and
   a baking step of heating the flat conductive wire, on which the particles of the polyamide-imide resin have been electrodeposited, to form an insulating film on the surface of the flat conductive wire, wherein
   a cross-sectional area of the flat conductive wire is set so that a diameter of a round wire having the same cross-sectional area as the rectangular cross-section of the flat conductive wire becomes 0.5 mm to 4.5 mm.

4. The method for manufacturing the insulated flat conductive wire according to claim 3,
   wherein the baking step includes: a low-temperature heating step of heating the flat conductive wire, on which the particles of the polyamide-imide resin have been electrodeposited, at a low temperature of 150° C. to 220° C. for 0.25 to 30 minutes; and a high-temperature heating step of heating the flat conductive wire, which has been heated at the low temperature, at a high temperature that is 30° C. or more higher than the temperature in the low-temperature heating step for 0.25 to 30 minutes.

5. The insulated flat conductive wire according to claim 1, wherein the film thickness ratio t1/t2 is in a range of 0.98 to 1.30.

6. The insulated flat conductive wire according to claim 1, wherein the film thickness at the center portion is 100 μm or less.

7. The insulated flat conductive wire according to claim 1, wherein the insulating film is formed by an electrodeposition method.

8. The insulated flat conductive wire according to claim 1, wherein the film thickness t1 is an average value of two locations at an upper side and a lower side in a center of the long side of the rectangular cross-section.

9. The insulated flat conductive wire according to claim 1, wherein the film thickness t2 is an average value of four locations at upper sides and lower sides in both edges of the long side of the rectangular cross-section.

10. The insulated flat conductive wire according to claim 1, wherein the edge portion of the long side of the rectangular cross-section is an end portion of the rectangular cross-section where roundness of the insulating film disappears, and the long side of the flat conductive wire and a surface of the insulating film begin to be parallel to each other.

* * * * *